(12) United States Patent
Boursier

(10) Patent No.: US 11,643,274 B2
(45) Date of Patent: May 9, 2023

(54) ENDLESS CONVEYOR BELT AND CONVEYOR DEVICE COMPRISING SUCH A CONVEYOR BELT

(71) Applicant: LIFTVRAC, Geneston (FR)

(72) Inventor: Marcel Boursier, Saint-Colomban (FR)

(73) Assignee: LIFTVRAC, Geneston (FR)

( * ) Notice: Subject to any disclaimer, the term of this patent is extended or adjusted under 35 U.S.C. 154(b) by 120 days.

(21) Appl. No.: 17/428,254

(22) PCT Filed: Feb. 12, 2020

(86) PCT No.: PCT/EP2020/053665
§ 371 (c)(1),
(2) Date: Aug. 3, 2021

(87) PCT Pub. No.: WO2020/165293
PCT Pub. Date: Aug. 20, 2020

(65) Prior Publication Data
US 2022/0135335 A1    May 5, 2022

(30) Foreign Application Priority Data

Feb. 13, 2019 (FR) ....................................... 1901456

(51) Int. Cl.
*B65G 15/40* (2006.01)
*B65G 15/36* (2006.01)
(Continued)

(52) U.S. Cl.
CPC ............. *B65G 15/40* (2013.01); *B65G 15/08* (2013.01); *B65G 15/36* (2013.01); *B65G 15/42* (2013.01);
(Continued)

(58) Field of Classification Search
CPC ........ B65G 15/40; B65G 15/08; B65G 15/56; B65G 15/36; B65G 15/42; B65G 15/46; B65G 15/34
USPC ......................................................... 198/819
See application file for complete search history.

(56) References Cited

U.S. PATENT DOCUMENTS 2,873,501 A * 2/1959 Renner .................. B65G 15/40
24/584.1
3,661,244 A    5/1972 Koyama
(Continued)

FOREIGN PATENT DOCUMENTS

| EP | 2406155 A1 | 1/2012 |
| JP | S55129208 U | 9/1980 |
| JP | S6220005 U | 2/1987 |

OTHER PUBLICATIONS

Search Report from the French Intellectual Property Office on corresponding FR application (FR1901456) dated Dec. 12, 2019.
(Continued)

*Primary Examiner* — Mark A Deuble
(74) *Attorney, Agent, or Firm* — KOS IP Law LLP

(57) ABSTRACT

The present invention concerns an endless conveyor belt for a conveyor device, which conveyor belt comprises a belt body that can be transversely deformed between a flat configuration, at rest, and a tubular configuration. This belt body comprises two transition regions over its width which between them define a central belt portion, as well as two side belt portions situated between each of them and the nearby side edge. At least one thickness of the side belt portions is greater than at least one thickness of the central belt portion, forming at least one over thickness region on each of the side belt portions.

16 Claims, 7 Drawing Sheets

(51) Int. Cl.
    *B65G 15/42*    (2006.01)
    *B65G 15/46*    (2006.01)
    *B65G 15/08*    (2006.01)
    *B65G 15/56*    (2006.01)
    B65G 23/06      (2006.01)

(52) U.S. Cl.
    CPC ............ *B65G 15/46* (2013.01); *B65G 15/56*
                    (2013.01); *B65G 23/06* (2013.01)

(56) References Cited

U.S. PATENT DOCUMENTS

| | | | | |
|---|---|---|---|---|
| 3,762,536 | A * | 10/1973 | Rogers | B65G 17/02 |
| | | | | 198/819 |
| 4,000,809 | A | 1/1977 | Lenntoft | |
| 5,836,440 | A * | 11/1998 | Mindich | B65G 15/08 |
| | | | | 198/821 |
| 7,124,879 | B1 * | 10/2006 | Maguire | B65G 15/42 |
| | | | | 198/690.2 |
| 7,261,203 | B2 * | 8/2007 | Mindich | B65G 15/08 |
| | | | | 198/819 |
| 8,997,974 | B2 * | 4/2015 | Boursier | B65G 15/08 |
| | | | | 198/819 |
| 2011/0114455 | A1 * | 5/2011 | Boursier | B65G 15/08 |
| | | | | 198/847 |

OTHER PUBLICATIONS

International Search Report and Written Opinion on corresponding PCT application (PCT/EP2020/053665) from International Searching Authority (EPO) dated Apr. 24, 2020.

* cited by examiner

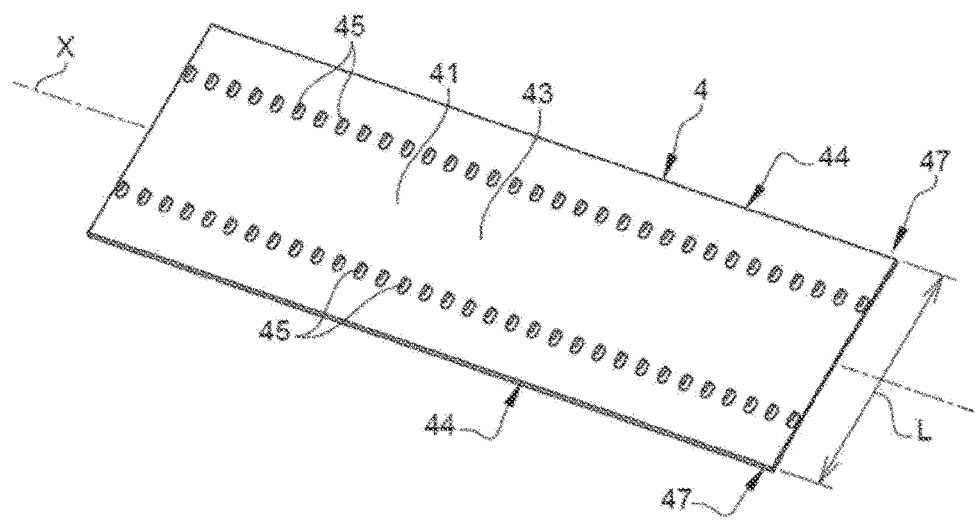
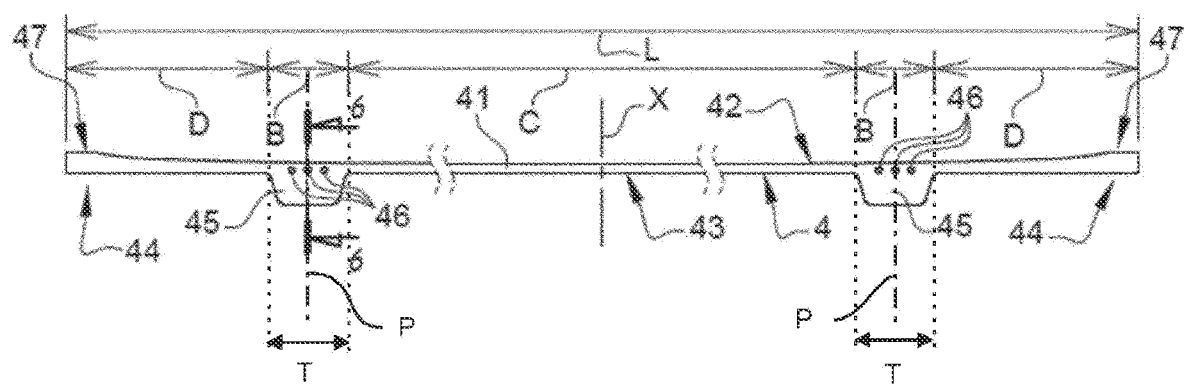

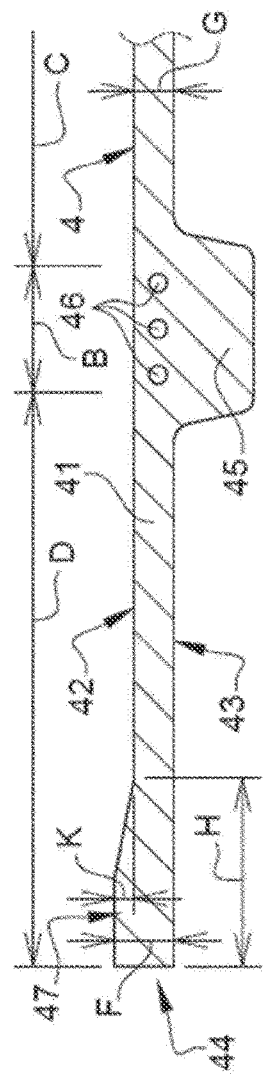
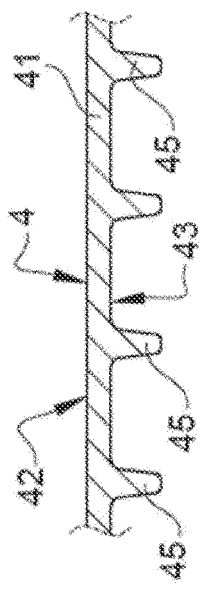

ENDLESS CONVEYOR BELT AND CONVEYOR DEVICE COMPRISING SUCH A CONVEYOR BELT

TECHNICAL FIELD

The present invention relates to the general field of conveyor devices used to move products from a lower level to a higher level by means of an endless conveyor belt.

More particularly, it relates to endless conveyor belts whose planar body, at rest, is transversely deformable into a tubular configuration.

And it further relates to a conveyor device comprising such an endless conveyor belt.

Such a conveyor device especially, but not exclusively, finds application in the field of the food industry, integrated within a manufacturing, processing or packaging line, for example for bulk products such as minced meat, fish or fish pieces, vegetables, grated cheese . . . .

BACKGROUND

As set forth in documents FR-2 933 964, EP-2 303 729 or EP-2 406 155, conveyor devices adapted for conveying and lifting products (in particular foodstuffs) are known.

In a known manner, a conveyor device comprises an endless conveyor belt that winds around two end deflection structures, for example pulleys, one of which is motorized to rotatably drive the conveyor belt in an endless loop motion about the two deflection structures.

Such a conveyor belt comprises an upper strand, which slopes upwards and supports the products to be conveyed, and a lower return strand.

The conveyor belt also comprises in a known manner a top face, called "product face", in contact with the products to be conveyed, and a bottom face, called "guide face", comprising regularly distributed protruding single-piece studs, which cooperate with the deflection structures of the conveyor device to ensure driving of the belt.

In a known manner, the conveyor belt has a planar configuration at the two deflection structures of the conveyor device to ensure loading and unloading of the products. It is further deformable transversely in a tubular (or at least substantially tubular) configuration, so as to form a kind of trough or tube on the upper strand in the rising part to guide products and ensure lifting thereof while limiting risks of product loss.

The conveyor belt is planar at rest and the conveyor device comprises means adapted to bend it to obtain the tubular configuration required at the rising part. In the tubular configuration, the two side ends of the conveyor belt meet to form a junction zone allowing closure of the tube.

In addition, for optimal operation, the deformable conveyor belt incorporates in its thickness a plurality of longitudinal reinforcing members (cables, planar straps, etc.) adapted to limit its longitudinal elongation.

In such a conveyor device, the conveyor belt follows a concave rising curved trajectory, just after the deflection structure allowing loading of products. The thickness of the conveyor belt has to be sufficiently large to prevent formation of folds in this concave curved portion, at the junction zone of both side ends of the belt.

However, the greater the thickness of the belt, the greater the forces required to bring it into tubular configuration, and the greater the friction of the belt on the means for bringing it into tubular configuration. This leads to very high tensile forces which reduce the lifetime of the belt, which is a significant drawback. The thickness of the belt is thus a compromise between flexibility to allow bending upon rising and tubular deformation (small thickness) and wear resistance during tension and guiding (large thickness).

A conveyor belt formed by superimposed layers of elastomeric material with different hardnesses is known. In a known manner, the product face is made of a material with a low hardness, providing it with a smoother surface without residues, which is favorable for product conveyance and cleaning of the face. A soft material also makes it easier to form the belt into its tubular configuration, without introducing too significant stresses into the belt. The guide face is generally made of a material with a higher hardness, so as to increase its lifetime by limiting friction on the deflection structures.

Incidentally, a conveyor device for forming a conveyor belt in a tubular configuration is known from document U.S. Pat. No. 3,661,244A1. For this, the side edges of the belt comprise an extra thickness for driving the edges by means of rollers. The two side ends of the product face are superimposed to each other so as to close the belt in its tubular configuration. However, such a superimposition is not desirable because it requires significant curving of the belt to allow superimposition of the side edges, which can cause significant stresses in the belt. In addition, such superimposition limits the volume of product to be conveyed, since it considerably reduces the surface area in contact with the product.

A conveyor device comprising a conveyor belt formed in a tubular configuration by incorporating a spring that restrains it in this configuration is also known from document U.S. Pat. No. 4,000,809A1. The conveyor device controls the opening of the spring to force the belt into a planar configuration so as to load and unload the product to be conveyed. To reinforce the belt, the belt is thicker at its two side ends accommodating the spring. However, as previously described, such a very thick belt is continuously subjected to large forces that strongly impact its lifetime.

Conveyor belts described in documents U.S. Pat. No. 3,661,244 A1 and U.S. Pat. No. 4,000,809 A1 cannot be made in several layers of different hardness as previously described without causing significant stresses in the belt, which would further be more difficult to form in a tubular configuration.

In order to overcome these drawbacks, the invention is directed to a conveyor belt that is flexible enough to be brought into a tubular configuration, without generating overstress in the belt, while ensuring the lifetime of the belt in use.

SUMMARY

In order to remedy the aforesaid drawback of the state of the art, the present invention provides an endless conveyor belt for a conveyor device, which conveyor belt comprises a belt body of width L and longitudinal median plane X, which belt body comprises a top face for receiving products to be conveyed, an opposite bottom face, for cooperating with drive means constituting said conveyor device, and two side edges parallel to each other, which belt body is transversely deformable between a planar configuration, at rest, and a tubular or at least substantially tubular configuration, in which the side edges are connected edge to edge, which belt body comprises two transition zones extending longitudinally over said width L of said belt body, the two transition zones being located at ¼ or approximately ¼ of said width L, on either side of said median plane X, which transition zones define between them a belt central part, as well as two belt side parts located between each of them and the belt side edge in the proximity thereof;

the conveyor belt being remarkable in that at least one thickness of said belt side parts is greater than at least one thickness of said belt central part, forming at least one extra thickness zone on each of said belt side parts, said extra thickness zone of each belt side part protruding from the top face of the conveyor belt so as to form a relief, the top face being planar between the extra thickness zones.

These side extra thicknesses provide localized reinforcement which makes it possible to avoid, or at least limit, formation of folds on the junction zone of both belt side parts, in other words on the side edges facing each other, in the aforementioned concave curved portion, when this belt is in a tubular configuration. On the other hand, because of their side location, the extra thicknesses do not impact forces required to bring the conveyor belt into a tubular configuration.

In other words, the addition of localized extra thicknesses advantageously allows the belt to maintain an overall thickness that is thin enough to allow its tubular shaping, while limiting the occurrence of high tensile stresses.

An extra thickness on the top face furthermore makes it possible to participate in guiding the products by forming a gutter, the planar central surface allowing easy and quick cleaning.

Moreover, an edge-to-edge connection of the conveyor belt in tubular configuration allows to benefit from a large volume of products to be conveyed without degrading the product, contrary to the conveyor belt of prior art whose edges are superimposed to each other. The addition of extra thicknesses on the side edges further increases the belt tightness in tubular configuration, that is when the side edges are positioned facing each other.

Other non-limiting and advantageous characteristics of the conveyor belt in accordance with the invention, taken individually or in any technically possible combinations, are as follows:
- at least one thickness of said belt side parts is greater than all the thicknesses of said belt central part;
- the thickness of at least part of said belt side parts, starting from the belt side edge in the proximity thereof, is constant and greater than all the thicknesses of said belt central part;
- at least one thickness of said belt side parts is at least 15% (and more preferably at least 30%, and more preferably at least 50%) greater than at least one thickness of said belt central part;
- the endless conveyor belt comprises an upper layer made of a first material having a first hardness and forming said top face, and a lower layer made of a second material having a second hardness and forming said bottom face, the second hardness of said lower layer being greater than the first hardness of said upper layer;
- said lower layer comprises softening recesses, and the lower layer comprises a constant or substantially constant thickness, regardless of said softening recesses;
- the endless conveyor belt comprises a plurality of longitudinal reinforcing members, disposed in its thickness, adapted to limit its possibilities of longitudinal elongation, which reinforcing members are positioned only on said transition zones of said belt width L, located at ¼ or approximately ¼ of said width L, on either side of said median plane X;
- the endless conveyor belt comprises protruding one-piece studs, evenly distributed on its bottom face, adapted to cooperate with said drive means of said conveyor device to ensure driving of the conveyor belt.

When the top face is formed by a material having a hardness lower than the hardness of the bottom face, the extra thickness zones protruding from the top face are formed by the same material as the top face. Such a configuration allows the extra thickness zones to be formed by a material having a low hardness relative to the hardness of the bottom face, further limiting occurrence of tensile stresses in the belt when forming the tubular configuration.

In one embodiment of the invention, the longitudinal reinforcing members are laterally centered in the transition zones.

In one alternative embodiment, with each transition zone comprising a mid-plane, the longitudinal reinforcing members are laterally offset from the mid-plane of the transition zones toward the ends of the conveyor belt.

Preferably, the upper layer has a constant central thickness and thickened side portions forming the extra thickness zones. A constant central thickness provides a large belt surface area for conveying products.

Preferably, the lower layer has a thickness of less than 1.1 mm, preferably less than 1 mm, allowing the belt to be reinforced with a layer of greater hardness while maintaining a flexible conveyor belt that can be easily formed into a tubular configuration. Advantageously, the local extra thickness of the upper layer allows the thickness of the rigid lower layer to be reduced. This results in reduced wear and improved service life.

Preferably, each zone of extra thickness extends continuously along the entire length of the belt, for ensuring continuity of the localized reinforcement, avoiding the formation of folds in the belt as a whole.

The invention also relates to an endless conveyor belt for a conveyor device, the conveyor device comprising at least one member for driving said conveyor belt, the conveyor belt comprising a belt body having a width and a longitudinally extending median plane, the belt body comprising a top face for receiving products to be conveyed, an opposite bottom face, for cooperating with said member for driving the conveyor device, and two side edges parallel to each other, the belt body comprising two longitudinally extending transition zones, the two transition zones being positioned in a distributed manner on either side of the median plane and located at ¼ of the width of the conveyor belt, the transition zones defining a belt central part, located between the two transition zones, and two belt side parts located on either side of the median plane between one of the transition zones and the adjacent belt side edge, each transition zone comprising a mid-plane, the conveyor belt comprising at least one reinforcing member mounted in each of the transition zones of the belt body, the conveyor belt being remarkable in that each reinforcing member is laterally offset from the mid-plane of the transition zone in which it is mounted toward the ends of the conveyor belt.

Such a positioning of the reinforcing cable makes it possible to offset the reinforcing zone from the mid-plane of the transition zone so as to form a reinforcing zone in the belt body closer to the side edges of the belt. Advantageously, such a configuration allows to further limit the formation of folds at the junction of the two belt side parts in the concave curved portion of the conveyor device, when the conveyor belt is in tubular configuration.

In the tubular configuration, in the absence of reinforcing members, the mid-planes of the transition zones, located at one quarter of the belt width on either side of the mid-plane, define the pitch line of the conveyor belt, that is, the place where the deformations are the lowest. When reinforcing members are present, in particular positioned outside the mid-planes of the transition zones, the pitch line follows the reinforcing members. The offset of the pitch line toward the ends of the belt allows deformations to be avoided when the belt is bent into a tubular configuration, thus increasing its lifetime and tightness.

In one embodiment of the invention, with each transition zone having a width, each one-piece stud extending laterally over the entire width of the transition zone in which it is located, each reinforcing member is positioned within the thickness of the conveyor belt below the one-piece stud of each transition zone.

In one alternative embodiment, the conveyor belt comprises a plurality of pairs of one-piece studs, each one-piece stud of a same pair comprising an internal side edge and an external side edge, the distance between the two external side edges of each pair of one-piece studs defining the width of the transition zone. According to a preferred aspect, each reinforcing member extends below the one-piece stud of the pair of studs that is located in the proximity of the end of the conveyor belt.

The present invention further relates to a conveyor device for conveying in particular bulk products, for example of the grated cheese, vegetables, minced meat, fish or fish pieces type . . . from a lower level to an upper level, which conveyor device comprises:

(i) an endless conveyor belt as defined above, (ii) two end deflection structures, one lower upstream and the upper downstream, at which deflection structures said endless conveyor belt comprises a planar or substantially planar transverse configuration, the top face of said endless conveyor belt, for receiving said products, comprising, between said deflection structures, at least one concave curved section and at least one lifting rising section, (iii) means for shaping said endless conveyor belt into a tubular configuration, over at least part of the length of said concave curved section and said lifting rising section, with its two side edges in contact or virtually in contact with each other on a line extending in a vertical plane passing through the longitudinal median plane X of the conveyor belt.

The present invention is also concerned with a method for forming a conveyor belt as previously described into a tubular configuration, the conveyor belt initially being in a planar configuration at rest, the formation method being carried out by means of a conveyor device as previously described. The method comprises:

a step of bending the side edges of the conveyor belt, a step of positioning the two side edges of the conveyor belt facing each other in an edge-to-edge manner, a step of forming a closed tube by bringing the two side edges into contact in an edge-to-edge manner.

Of course, the various characteristics, alternative and embodiments of the invention can be associated with each other in various combinations as long as they are not incompatible or exclusive of each other.

BRIEF DESCRIPTION OF THE DRAWINGS

Furthermore, various other characteristics of the invention are apparent from the appended description made with reference to the drawings which illustrate non-limiting embodiments of the invention and wherein:

FIG. 3 shows the part of the conveyor belt illustrated in FIG. 2, in a perspective view, in a planar configuration and on the side of its bottom face;

FIG. 4 is a cross-section view of the conveyor belt along the sectional plane 4-4 of FIG. 2;

FIG. 5 is an enlarged view of a side part of the conveyor belt illustrated in FIG. 4;

FIG. 6 is a cross-section view of a part of the conveyor belt along the sectional plane 6-6 of FIG. 4;

It should be noted that, in these figures, the structural and/or functional elements common to the various alternatives may have the same references.

DETAILED DESCRIPTION

Figure 1:
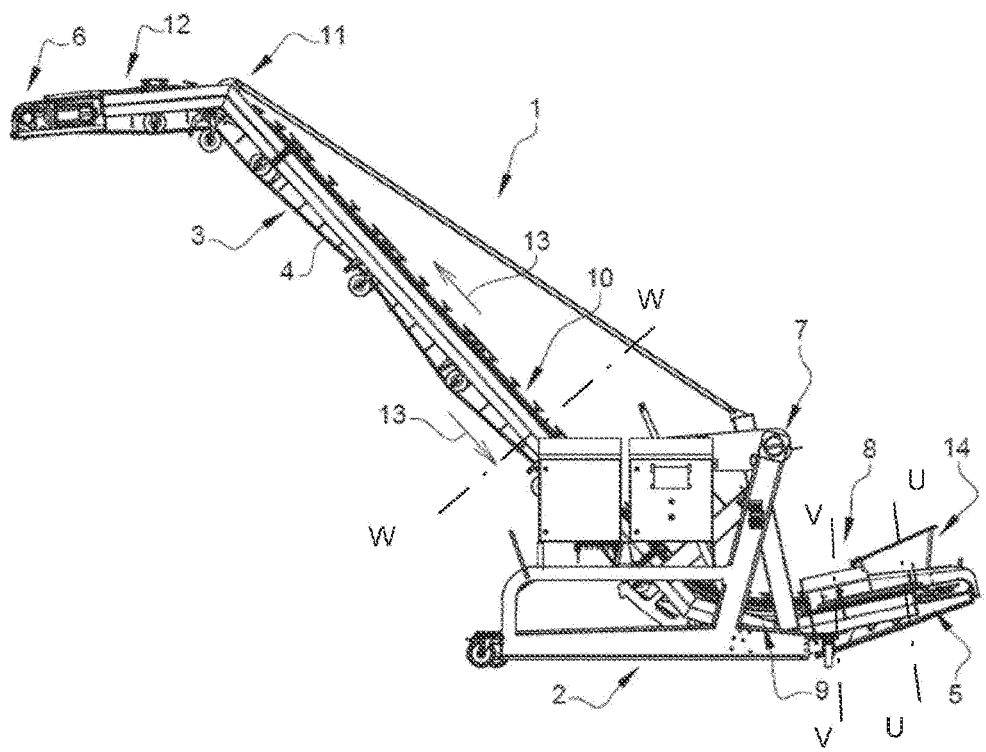
FIG. 1 is a schematic elevation view of a conveyor device in accordance with the invention.

The conveyor device 1 illustrated in FIG. 1 comprises a conveyor carriage 2 that carries a conveying structure 3.

This conveyor device 1 is adapted to move products from bottom to top, for example bulk food products such as meat, fish, grated cheese or vegetable.

The conveying structure 3 comprises an endless conveyor belt 4 which winds around two end drums (one lower upstream 5, and the other upper downstream 6), and which is guided by deflection members to generally provide it with an S-shape.

This conveying structure 3 is hingedly mounted to the conveyor carriage 2 about a horizontal pivot axis 7. Pivoting the conveying structure 3 about the pivot axis 7 is used to adapt the lifting height of the conveyor device 1.

Within the conveyor belt 1, the conveyor belt 4 comprises an upper strand, the upper face of which forms the product conveyance surface, and a lower strand, forming a return strand.

The upper strand of the conveyor belt 4 is guided by the conveying structure 3 in such a way as to define, starting from the upstream drum 5, a rectilinear loading section 8 for conveyed products, followed by a concave rising curved section 9, followed by a rectilinear rising section 10, itself followed by a convex curved section 11, and then by a rectilinear unloading section 12 for the products, which ends at the downstream end drum 6.

The concepts of concavity and convexity mentioned above can be appreciated from a top view of the conveyor belt 4 or the conveyor device 1.

The conveyor device 1 comprises conventional means for tensioning or relaxing the endless conveyor belt 4.

On the other hand, one of the end drums, advantageously the downstream end drum 6, is associated with a motorization that allows it to be rotated in order to form drive means of the conveyor belt 4, in the direction of the directional arrows 13.

The conveyor belt 4 is made of a flexible material, for example of polyurethane type elastomer, so as to allow its deformation in a direction transverse to its length, in particular to allow it to be brought into a tubular configuration.

At the upstream and downstream drums 5 and 6, the conveyor belt 4 has a planar or substantially planar transverse configuration (as represented in FIGS. 2 to 6 as well as 10A). On the other hand, between the loading section 8 and the unloading section 12, the lifting conveyor device 1 is structured to shape the conveyor belt 4 in a curved configuration and more particularly in a tubular configuration, this over most part of the concave curved section 9, over the entire length of the rising section 10 and over most of the convex curved section 11, thus taking advantage of its characteristics of transverse flexibility, in order to optimize the rising conveyance of products.

At the loading section 8, the conveyor belt 4 has a planar or substantially planar configuration, adapted to allow the products to be deposited, for example via a hopper 14.

This loading section 8 can be structured as a falling slope, as illustrated in FIG. 1; in alternative embodiments, the corresponding falling slope can be less pronounced. The loading section 8 can also extend horizontally or as a slightly rising slope, in particular depending on the nature of the products to be conveyed.

Bringing the conveyor belt 4 into curved configuration is initiated at the loading section 8, or immediately following it, by means of suitably arranged longitudinal guide members in the form of wires, rails, profiles, rollers or the like.

Figure 10A:
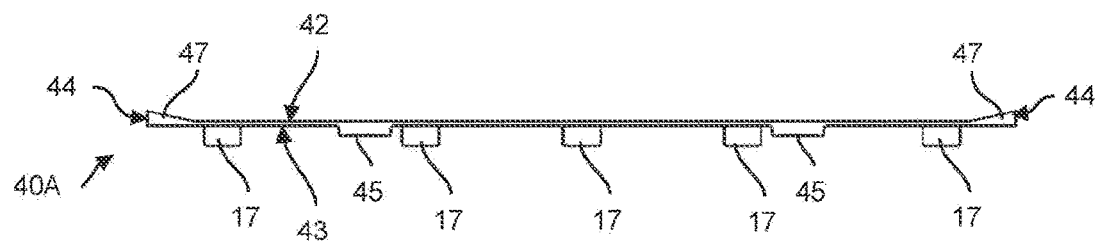
FIGS. 10A to 10C are cross-section views of the conveyor belt according to cross-sectional planes U-U, V-V, W-W of FIG. 1 representing the course of the conveyor belt during the transition from the planar configuration to the tubular configuration.

Upstream of the complete tubular configuration, the guide members of the conveyor device 1 gradually deform the conveyor belt 4 from the planar transverse configuration (at the end drum 5 as illustrated in FIG. 10A) to the tubular configuration (FIG. 10C) preserving an adapted space for loading products.

Figure 10B:
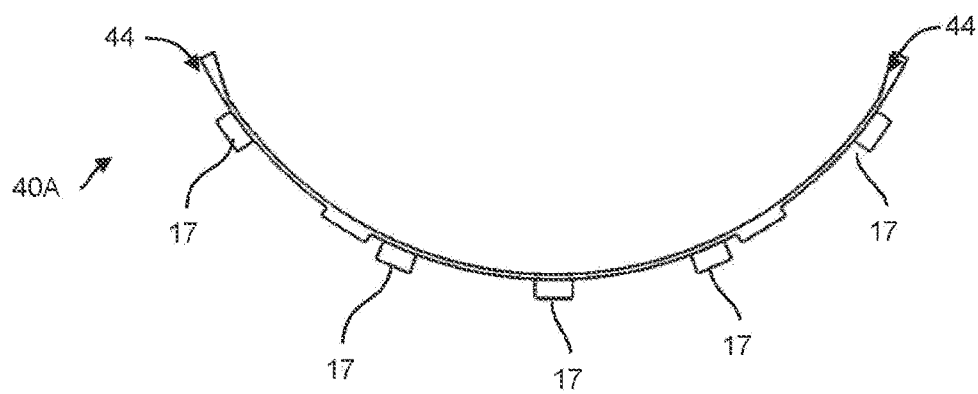
Figure 10C:
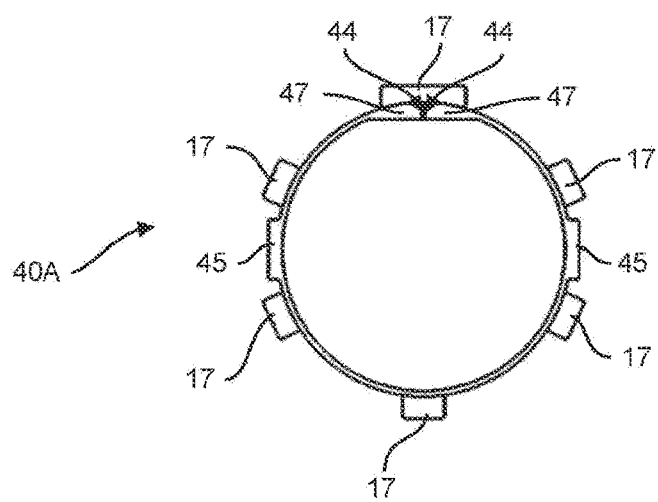

In other words, in order to form the conveyor belt 4 in the tubular configuration, with reference to FIGS. 10A, 10B, 10C, the upper strand 40A of the conveyor belt 4 is deformed so as to be gradually curved in its width. FIGS. 10A to 10C represent a cross section view of the conveyor belt 4 in the sectional planes U:U, V:V and W:W distributed along the rising section 10 of the conveyor device 1 as represented in FIG. 1.

In a preferred embodiment, the conveyor device 1 comprises six guide members 17, for example slides, equally distributed over the width of the conveyor belt 4.

For the formation of the conveyor belt 4 in the tubular configuration, the conveyor belt 4 initially in the planar configuration (FIG. 10A), arrives at the rising section 10, the edges of the conveyor belt 4 slide along the guide members 17 and are gradually drawn back towards each other (FIG. 10 B). The side edges are then positioned facing each other so as to form a junction zone. The conveyor belt 4 then forms a closed tube (FIG. 10C) by bringing the two side edges into edge-to-edge contact.

Downstream of the complete tubular configuration, the guide members gradually deform the conveyor belt 4 from said tubular configuration to a planar configuration (at the end drum 6).

Starting from the above-described structure of the conveyor device 1, the conveyor belt 4 being driven by the motorized downstream end drum 6, the products can be deposited on the loading section 8. They are then gradually channeled into the tubular part of the concave curved section 9, accumulate in the upstream part of the rising section 10, and are conveyed upwards to the downstream part of the conveyor belt 1 under the effect of the movement of the conveyor belt 4, its tubular shaping, and the thrust of the upstream products.

Arriving at the unloading section 12, and in particular the downstream end drum 6, the products are recovered by any adapted structure such as a receiving hopper, a transport conveyor, an outlet chute or the like.

Preferably, the conveyor device 1 comprises a scraper positioned at the motorized downstream end drum 6, so as to ensure recovery of all products, in particular sticky products that may adhere to the belt.

Figure 7:
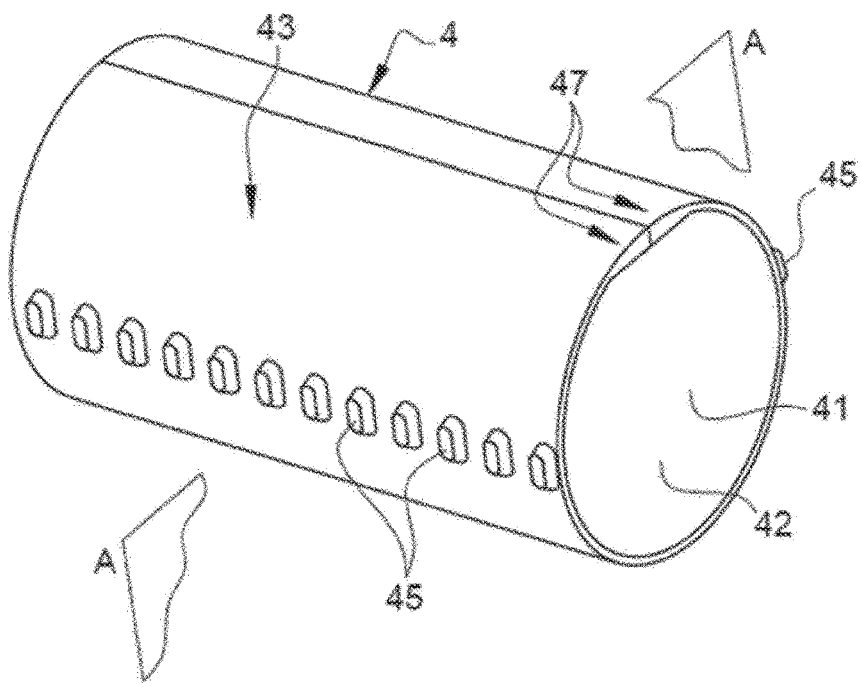
FIG. 7 shows a part of the conveyor belt of FIGS. 2-6, illustrated here in perspective and in a tubular configuration.
Figure 8:
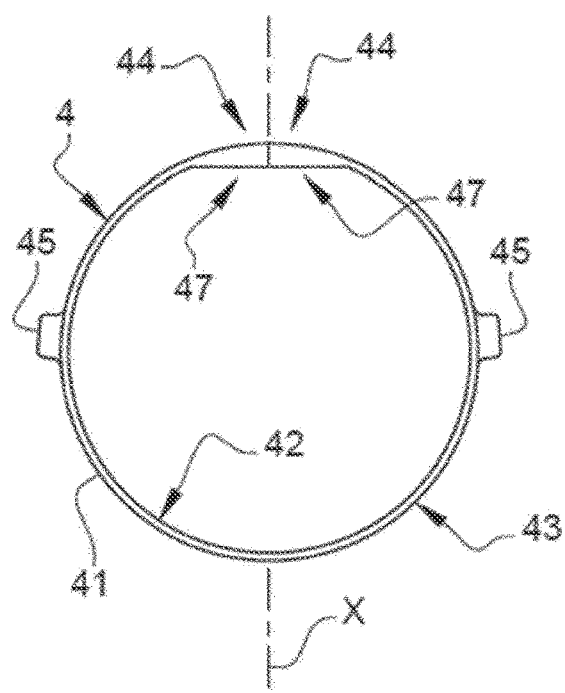
FIG. 8 is a cross-section view of the conveyor belt along the cross-sectional plane A-A of FIG. 7.

The conveyor belt 4 according to the invention is structured in such a way as to limit, or even avoid, the formation of folds in the concave curved section 9, at the edge-to-edge junction line or zone of the two side parts of the conveyor belt 4 configured as a tube (this junction line/zone being positioned on the upper generatrix of the tube located in the median plane X of the belt, as represented in FIGS. 7 and 8).

The structure of the conveyor belt 4 is detailed in FIGS. 2 to 8; in particular, the conveyor belt 4 is illustrated in a planar configuration in FIGS. 2 to 6 and in a tubular configuration in FIGS. 7 and 8.

Figure 2:
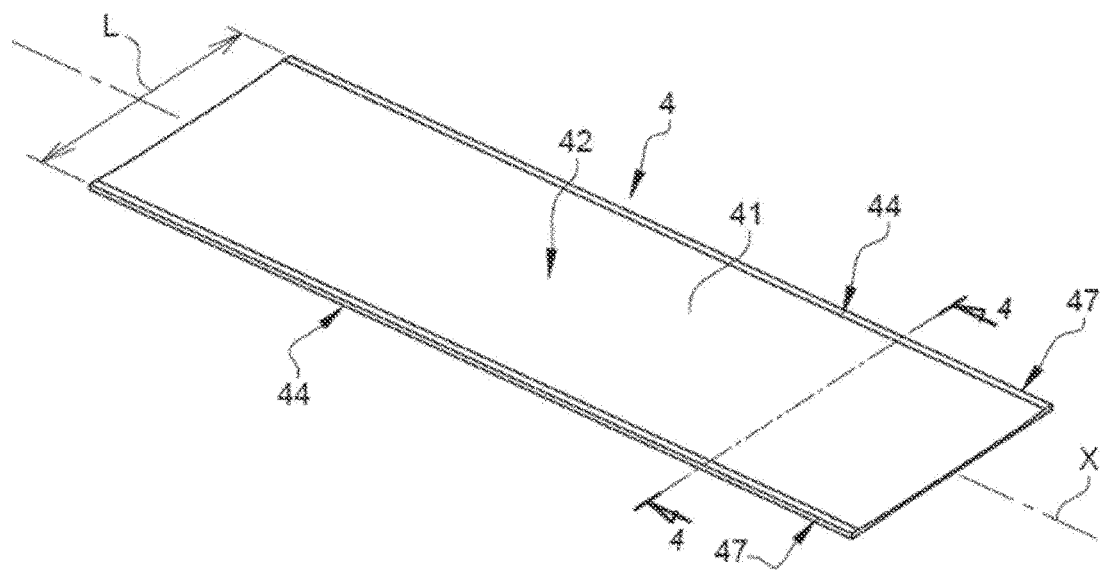
FIG. 2 shows a part of the conveyor belt according to the invention which equips the conveyor device illustrated in FIG. 1, in a perspective view, in planar configuration and on the side of its top face.

As represented in FIGS. 2 and 3, this conveyor belt 4 comprises a belt body 41 of width L and longitudinal median plane X.

The belt body 41 comprises a top face 42, an opposite bottom face 43, and two side edges 44 parallel to each other.

By top face 42, it is meant a "product face", that is the face configured to be brought into contact with the product to be conveyed. Conversely, the opposite bottom face 43 corresponds to a so-called "guide face", that is the face in contact with the upstream 5 and downstream 6 drums of the conveyor device 1, configured to drive the conveyor belt 4.

By convention, the belt body 41 comprises two so-called "transition" zones B extending longitudinally over the width L of the conveyor belt 4. The two transition zones B are located at ¼ or approximately ¼ of this width L, on either side of the median plane X. These two transition zones B extend parallel to the side edges 44 and to the median plane X; they may be linear or extend over a small belt width (FIGS. 4 and 5).

The two transition zones B define between them a belt central part C, as well as two belt side parts D located on either side of the median plane X, between one of the transition zones B and the side edge 44 in the proximity thereof, that is the side edge 44 adjacent to the belt side part D.

As represented in FIG. 4, each transition zone B comprises a mid-plane P and extends over a width T.

The top face 42 of the belt body 41 is smooth, devoid of protrusion(s).

Figure 13:
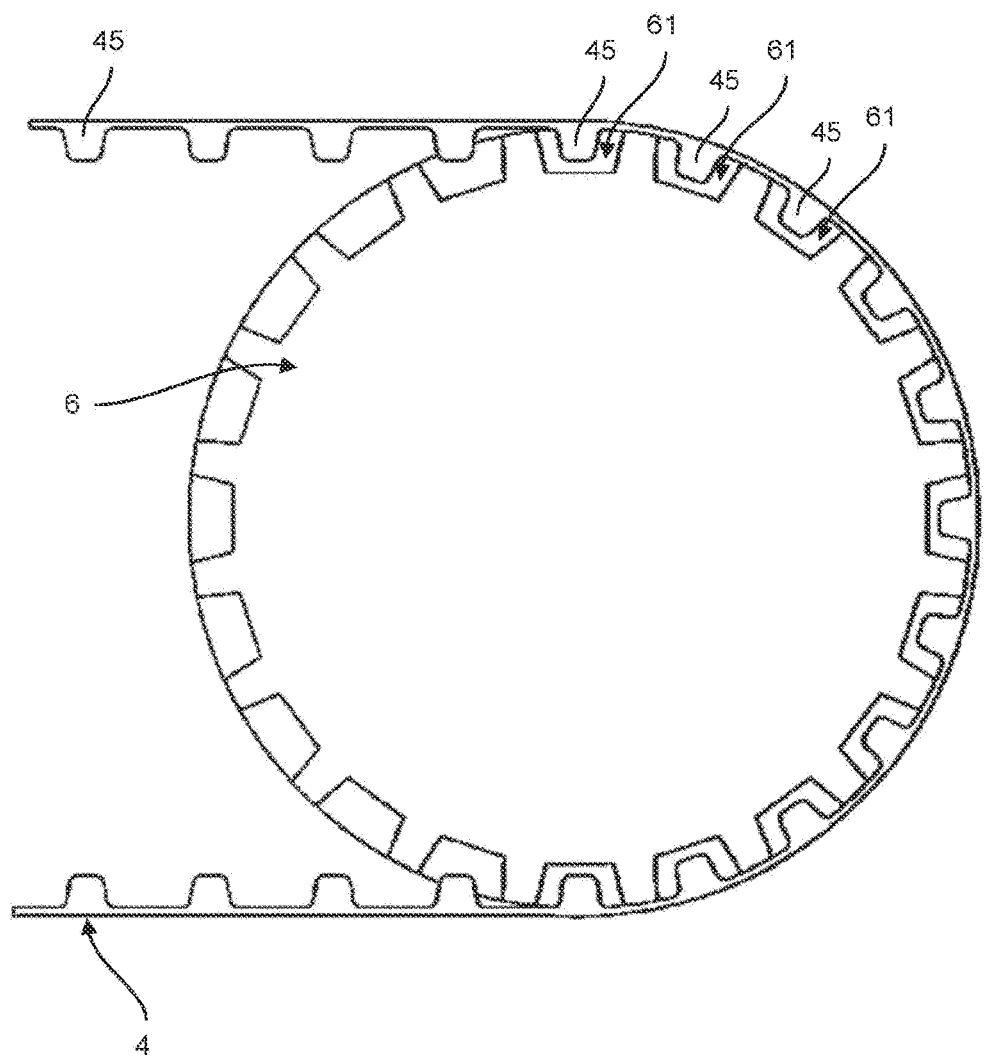
FIG. 13 is a cross-section view of the conveyor belt along a longitudinal sectional plane representing driving of the conveyor belt by a drive member.

The bottom face 43 comprises protruding one-piece studs 45 adapted to cooperate with drive members 61 of the motorized downstream end drum 6 to ensure driving and guiding of the conveyor belt 4 (as represented in FIG. 13). In this example, the drive members 61 are in the form of recesses or notches, configured to cooperate with the one-piece studs 45 in a form-fit manner.

Figure 11A:
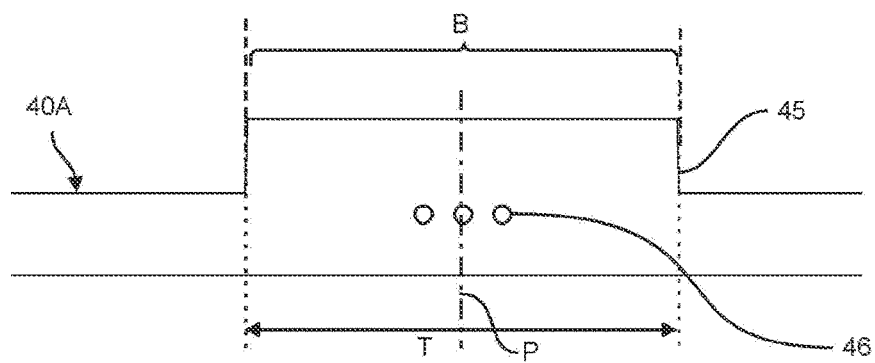
FIGS. 11A and 11B are schematic representations of a transition zone comprising a one-piece stud and a plurality of reinforcing cables in a centered configuration and in an offset configuration.

According to a preferred embodiment of the invention, the one-piece studs 45 are arranged on regularly spaced transverse lines; there are two of them on each line, positioned symmetrically with respect to the axis X of the conveyor belt 4, here on the two transition zones B, that is, at ¼ or approximately ¼ of the width L of the belt body 41, on either side of the median plane X. As represented in FIG. 11A, each one-piece stud 45 of a same transverse line extends substantially over the entire width T of the transition zone B in which it is positioned.

Alternatively, there are four one-piece studs 45 on each transverse line, positioned in pairs of two symmetrically on either side of the median axis X of the conveyor belt 4. Preferably in such a configuration, each pair of one-piece studs 45 is positioned at one of the transition zones B.

Figure 12A:
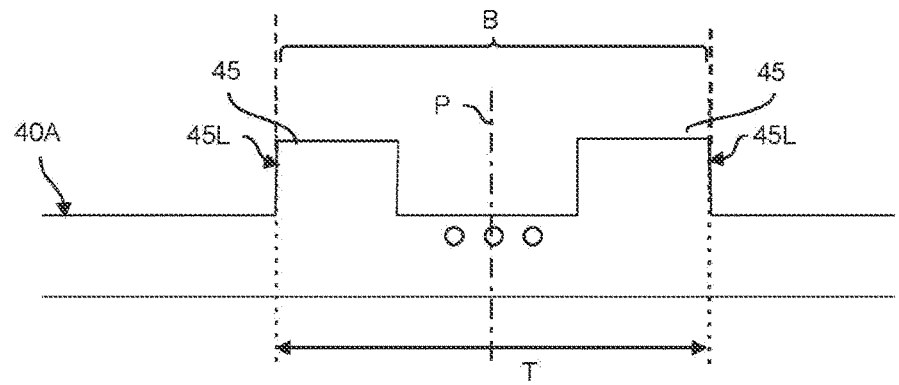
FIGS. 12A and 12B are schematic representations of a transition zone comprising a pair of one-piece studs and a plurality of reinforcing cables in a centered configuration and in an offset configuration.

In this example represented in FIG. 12A, each single-piece stud 45 of a same pair comprises an internal side edge and an external side edge 45L, the distance between the two external side edges 45L of each pair of single-piece studs 45 defines the width T of the transition zone B in which it is located. In other words, the width T of a transition zone B corresponds to the width of a pair of one-piece studs 45.

On the other hand, as described in document EP-2 303 729A1, the conveyor belt 4 is structured to limit its possibilities of longitudinal elongation as much as possible, using longitudinal reinforcing elements (cable(s) or strap(s), for example) integrated in the bulk.

Herein, as can be seen in FIGS. 4 and 5, the belt body 41 of the conveyor belt 4 comprises in this example two groups of three longitudinal reinforcing cables 46, disposed in its thickness, so as to form reinforcing zones. It goes without saying that the number of reinforcing cables 46 may be different, for example the conveyor belt 4 may comprise two groups of twelve reinforcing cables 46. It is noticed that each of these groups of reinforcing cables 46 is positioned at one of the transition zones B (that is, these groups of reinforcing cables 46 are located at ¼ or approximately ¼ of said belt width L, on either side of the median plane X).

In this way, the reinforcing members 46 thus follow the pitch line of the conveyor belt 4 in a tubular configuration and allow its mechanical strength to be improved. In other words, the reinforcing members 46 are positioned close to the pitch line of the conveyor belt 4 without a reinforcing cable and thus allow the mechanical strength (in particular the tensile capacity) to be improved while limiting stresses in the conveyor belt 4.

In a first embodiment, represented in FIG. 11A, each group of reinforcing cables 46 is positioned substantially centered on each transition zone B with respect to its width T. In other words, in the case of three reinforcing cables 46, the central reinforcing cable 46 is aligned with the mid-plane P of the transition zone B (as represented in FIG. 4).

Figure 11B:
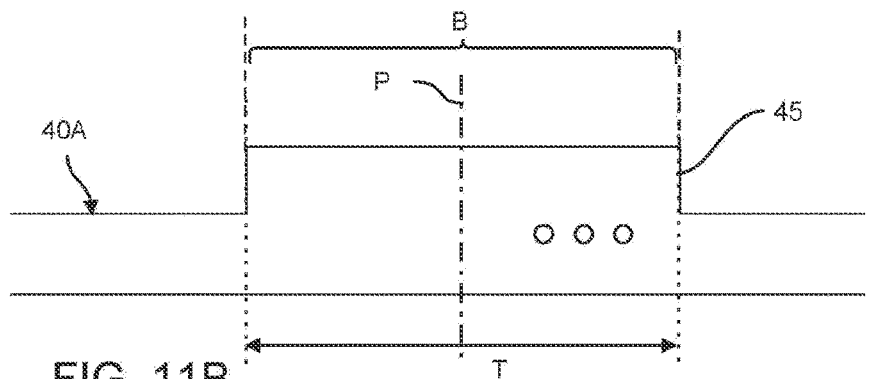

In a second embodiment, represented in FIG. 11B, each group of reinforcing cables 46 is laterally offset from the mid-plane P of each transition zone B toward the ends of the conveyor belt 4. Such a configuration advantageously allows the belt side parts D to be reinforced, to make sure of the absence of formation of folds at the junction of the side edges 44, when the conveyor belt 4 is placed in its tubular configuration.

Figure 12B:
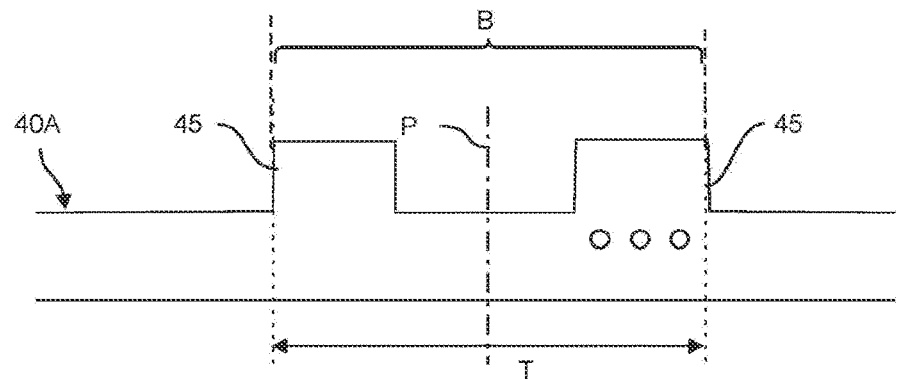

In the case of a conveyor belt 4 comprising four studs on each transverse line, that is comprising two pairs of studs, the reinforcing cables 46 are preferably laterally offset from the mid-plane P of each transition zone B towards the ends of the conveyor belt 4. More preferably, the reinforcing cables 46 are positioned under the one-piece stud 45 of the pair of studs positioned closest to the side ends of the conveyor belt 4, as represented in FIG. 12B. Of course, the reinforcing cables 46 may also be positioned centered on each transition zone B with respect to its width T, as represented in FIG. 12A.

In a preferred embodiment, the conveyor belt 4 according to the present invention is characterized in that it does not comprise a regular thickness over the entire width L of its belt body 41, and in particular in that at least one thickness F of its belt side parts D is greater than at least one thickness G of its belt central part C, thus forming at least one side extra thickness 47 on each of said belt side parts D.

As represented in FIG. 4, the side extra thicknesses 47 according to the invention are configured to project from the top face 42 of the conveyor belt 4, the top face 42 being planar between the extra thickness zones 47.

In this context, preferably at least one thickness F of said belt side parts D is greater than all thicknesses G of said belt central part C. And more preferably, the thickness F of at least part of said belt side parts D, from the adjacent belt side edge 44, is constant and greater than all thicknesses G of said belt central part C.

Such side extra thicknesses 47 (visible in FIGS. 2, 3, 4, 5, 7 and 8) provide the conveyor belt 4 with a localized reinforcement which makes it possible to avoid, or at least to limit, formation of folds on the junction zone of both belt side edges 44, in particular in the concave curved section 9, without (or without too much) being detrimental to forces required to bring the conveyor belt 4 into a tubular configuration.

Figure 9:
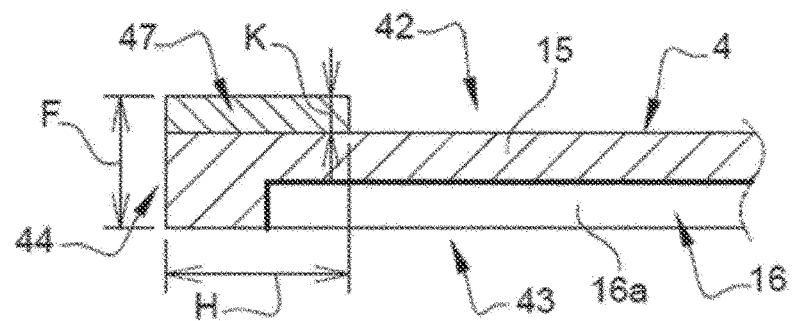
FIG. 9 is a cross-section view of a side part of an alternative embodiment of the conveyor belt according to the invention.

The side extra thicknesses 47 can be made in one piece with the material of the belt body 41, when such a belt body 41 is made of an elastic material with a low hardness (for example as is the case in the embodiment represented in FIGS. 2 to 8), or can consist of elements assembled and secured to the belt body 41 (for example as illustrated in FIG. 9).

Preferably, these side extra thicknesses 47 are provided on the side of the top face 42 of the belt body 41.

More preferably, the side extra thicknesses 47 extend from both side edges 44 and over a length H that is less than the length of the belt side parts D. The side extra thicknesses 47 are identical along the entire length of the conveyor belt 4.

As can be seen in the embodiment of FIGS. 2 through 8, starting from the side edges 44, these side extra thicknesses 47 may have a part of constant maximum thickness K, followed by a part of decreasing thickness until it reaches the thickness G of the belt central part C.

As illustrated in FIG. 9, the side extra thicknesses 47 may comprise a constant thickness along their entire length H.

The dimensions in maximum thickness K and length H of the side extra thicknesses 47 are adapted according to the desired result in terms of tolerable force for bending the conveyor belt 4 and eliminating the aforementioned folds.

In this context, preferably at least one thickness F of said belt side parts D is greater by at least 15%, more preferably by at least 30%, and more preferably by a value greater than 50%, than at least one thickness G of the belt central part C.

As a purely indicative example, for a belt body 41 whose width L is 350 mm and whose thickness G of the central portion C is 6 mm, the side extra thicknesses 47 may have a maximum thickness K in the order of 2.5 mm to 4 mm and extend over a length H in the order of 10 mm to 30 mm.

FIG. 9 is a partial cross-section view illustrating an alternative embodiment of a conveyor belt 4 according to the invention, this conveyor belt being of the type described in document EP-2 406 155 A1, that is, the conveyor belt 4 comprises two or three superimposed layers made of different elastomeric materials. By the expression "different elastomers", it is meant that the different layers are made of a same elastomeric material having different hardnesses. For example, each layer can be made of an elastomeric material 70 Shore A, 80 Shore A, 54 Shore D . . . where the first number corresponds to a qualified hardness value on a hardness scale, represented by the letter A or D, higher or lower. The Shore A and D hardness scales are known to the skilled person and especially described in IS0868, ASTMD 2240, DIN 535050 standards.

In the example of a conveyor belt 4 comprising two layers, it comprises an upper layer 15 made of a first material, forming said top face 42, and a lower layer 16 made of a second material, forming said bottom face 43, the hardness of said lower layer 16 being greater than the hardness of said upper layer 15, in particular to limit friction on the drive and guide means of the conveyor device 1.

In this embodiment, since the extra thickness zones 47 project from the top face 42, these are preferably formed in the upper layer 15. Thus, the side extra thicknesses 47 are made of the first material having a lower hardness than the hardness of the bottom face 43.

Also, the upper layer 15 preferably has a constant central thickness and thickened side edges forming the extra thickness zones 47, for benefiting from the advantages of the extra thickness zones while ensuring a sufficiently large product face area to ensure conveyance of a large number of products.

Preferably, the lower layer 16 has a constant central thickness preferably less than 1.1 mm, more preferably less than 1 mm. Thus, the layer with a high hardness has a reduced thickness, so as not to cause overstresses in the conveyor belt 4 when it is brought into the tubular configuration.

In summary, the conveyor belt 4 has a face in contact with the drive and guide means of the conveyor device 1 with a sufficient hardness to limit friction of the conveyor belt 4 with the drive and guide means. The upper layer 15 and the side extra thicknesses 47 being made of a material with a lower hardness, they are more flexible. Also, such a configuration advantageously makes it possible to reinforce the side edges 44 sufficiently to limit formation of folds when the conveyor belt 4 is brought into a tubular configuration, while limiting tensile forces in the belt body 41.

Advantageously, the lower layer 16 comprises softening recesses 16a that allow the resistance to longitudinal deformations of the conveyor belt 4 to be reduced.

In this alternative embodiment in FIG. 9, the lower layer 16 comprises a constant or substantially constant thickness (without taking into account the softening recesses 16a), and the side extra thicknesses 47 are made at the upper layer 15 of a material of lower hardness.

In this case, the side extra thicknesses 47 are made by means of strips of material assembled and secured to the sides of the top face of the upper layer 15. The material of these assembled strips may be the same as or different from that of the upper layer 15.

Other alternative embodiments can be devoid of such softening recesses 16a.

As can be seen in FIGS. 7 and 8, when the conveyor belt 4 is in a tubular configuration, the two side extra thicknesses 47 are close to each other and come into contact, or virtually into contact at an upper generatrix of the tube located in the median vertical plane X. In other words, in a preferred embodiment, the side edges 44 are configured to be joined edge-to-edge upon bringing the conveyor belt 4 into a tubular configuration.

The side extra thicknesses 47 thus reinforce the junction zone, which makes it possible to limit or even avoid formation of folds on the side edges 44 of the conveyor belt 4, in the concave curved section 9, when the conveyor belt 4 is in tubular configuration.

On the other hand, these side extra thicknesses 47 made of a material of low hardness and located in the upper part of the tube have no, or little, adverse effect on forces required to bring the conveyor belt 4 into a tubular configuration, which are mostly applied to the transition zones B, that is, to the zones located at ¼ or approximately ¼ of said width L, on either side of the median plane X.

The invention claimed is:

1. An endless conveyor belt for a conveyor device, which conveyor belt comprises a belt body of width and longitudinal median plane, which belt body comprises a top face for receiving products to be conveyed, an opposite bottom face for cooperating with drive means constituting said conveyor device, and two side edges parallel to each other,
    which belt body is transversely deformable between a planar configuration, at rest, and a tubular or at least substantially tubular configuration, in which the two side edges are connected edge to edge,
    which belt body comprises two transition zones extending longitudinally over said width of said belt body, the two transition zones being located at ¼ or approximately ¼ of said width, on either side of said median plane,
    which transition zones define between them a belt central part, as well as two belt side parts located between each of them and the belt side edge in the proximity thereof,
    the conveyor belt wherein at least one thickness of said belt side parts is greater than at least one thickness of said belt central part, forming at least one extra thickness zone on each of said belt side parts, said extra thickness zone of each belt side part protruding from the top face of the conveyor belt so as to form a relief, the top face being planar between the extra thickness zones.

2. The endless conveyor belt according to claim 1, wherein at least one thickness of said belt side parts is greater than all thicknesses of said belt central part.

3. The endless conveyor belt according to claim 1, wherein the thickness of at least part of said belt side parts, from the belt side edge in the proximity thereof, is constant and greater than all thicknesses of said belt central part.

4. The endless conveyor belt according to claim 1, wherein at least one thickness of said belt side parts is at least 15% greater than at least one thickness of said belt central part.

5. The endless conveyor belt according to claim 4, wherein at least one thickness of said belt side parts is at least 30% greater than at least one thickness of said belt central part.

6. The endless conveyor belt according to claim 5, wherein at least one thickness of said belt side parts is at least 50% greater than at least one thickness of said belt central part.

7. The endless conveyor belt according to claim 1, comprising an upper layer made of a first material having a first hardness and forming said top face, and a lower layer made of a second material having a second hardness and forming said bottom face, the second hardness of said lower layer being greater than the first hardness of said upper layer.

8. The endless conveyor belt according to claim 7, wherein the upper layer has a constant central thickness and thickened side portions forming the extra thickness zones.

9. The endless conveyor belt according to claim 7, wherein the lower layer has a thickness of less than 1.1 mm.

10. The endless conveyor belt according to claim 7, wherein the lower layer has a thickness of less than 1 mm.

11. The endless conveyor belt according to claim 7, wherein, said lower layer comprises softening recesses, and wherein the lower layer has a constant or substantially constant thickness, regardless of said softening recesses.

12. The endless conveyor belt according to claim 1, comprising a plurality of longitudinal reinforcing members, disposed in its thickness, adapted to limit its possibilities of longitudinal elongation, which reinforcing members are positioned only on said transition zones of said belt width, located at ¼ or approximately ¼ of said width, on either side of said median plane.

13. The endless conveyor belt according to claim 12, wherein the longitudinal reinforcing members are laterally centered in the transition zones.

14. The endless conveyor belt according to claim 12, wherein, each transition zone comprising a mid-plane, the longitudinal reinforcing members are laterally offset from the mid-plane of the transition zones toward the ends of the conveyor belt.

15. The endless conveyor belt according to claim 1, comprising protruding one-piece studs, evenly distributed on its bottom face, adapted to cooperate with said drive means of said conveyor device to ensure driving of said conveyor belt.

16. A conveyor device for conveying in particular bulk products, for example grated cheese, vegetables, minced meat, fish or fish pieces . . . , from a lower level to an upper level, which conveyor device comprises:
   an endless conveyor belt according to claim 1,
   two end deflection structures, namely a lower upstream and the other upper downstream, at which deflection structures said endless conveyor belt comprises a planar or substantially planar transverse configuration, the top face of said endless conveyor belt, for receiving said products, comprising, between said deflection structures, at least one concave curved section and at least one lifting rising section,
   means for shaping said endless conveyor belt into a tubular configuration, over at least part of the length of said concave curved section and said lifting rising section, with its two side edges in contact or virtually in contact with each other on a line extending in a vertical plane passing through the longitudinal median plane of said conveyor belt.

* * * * *